(12) United States Patent
Aron

(10) Patent No.: US 8,864,349 B2
(45) Date of Patent: Oct. 21, 2014

(54) ILLUMINATED MOTORCYCLE EXHAUST APPARATUS

(71) Applicant: Mathew R Aron, San Diego, CA (US)

(72) Inventor: Mathew R Aron, San Diego, CA (US)

( * ) Notice: Subject to any disclaimer, the term of this patent is extended or adjusted under 35 U.S.C. 154(b) by 217 days.

(21) Appl. No.: 13/573,860

(22) Filed: Oct. 9, 2012

(65) Prior Publication Data

US 2014/0098552 A1    Apr. 10, 2014

(51) Int. Cl.
*B62J 6/00*    (2006.01)

(52) U.S. Cl.
USPC .......................................................... 362/473

(58) Field of Classification Search
None
See application file for complete search history.

(56) References Cited

U.S. PATENT DOCUMENTS

| 6,491,418 B1* | 12/2002 | Chen | 362/487 |
| 6,663,269 B1* | 12/2003 | Leu | 362/487 |
| 2003/0174506 A1* | 9/2003 | Chang | 362/487 |

\* cited by examiner

*Primary Examiner* — Britt D Hanley

(57) ABSTRACT

An illuminated motorcycle exhaust apparatus is provided. In one embodiment, the illuminated motorcycle exhaust apparatus includes a light assembly housing sized to be removeably coupled to a distal end of a motorcycle exhaust. A thermally insulated light assembly is coupled to the light assembly housing, the thermally insulated light assembly is capable of providing a brake indicator function, a running light function, and a turn indicator function. An optional insertable motorcycle exhaust tip is sized to be removeably insertable into the light assembly housing so that a distal end portion of the motorcycle exhaust tip extends from the light assembly housing.

18 Claims, 5 Drawing Sheets

ILLUMINATED MOTORCYCLE EXHAUST APPARATUS

FIELD OF THE INVENTION

The present invention generally relates to vehicle lighting. More particularly, the invention concerns an illuminated motorcycle exhaust.

BACKGROUND OF THE INVENTION

The popularity of motorcycling continues to increase. Riders are attracted to the freedom of the open road, leaving behind the cares and worries of everyday life. Motorcycle manufacturers have seized upon the recent surge in popularity and have been selling motorcycles and accessories in record numbers.

While luring riders with their freedom and performance, motorcycles are substantially more dangerous than automobiles. A motorcycle rider almost always fares much worse than an automobile driver when an accident between the two vehicles occurs. With the increase in motorcycle popularity, has come an increase in motorcycle accidents. In response, some states have mandated that motorcycle riders must wear helmets, and also suggest that they wear reflective vests and protective clothing.

Motorcycle manufacturers have also introduced several safety features aimed at increasing safety. For example, motorcycle headlights are always illuminated, day or night. Brake performance has improved, decreasing braking distances, and tire reliability has reduced blow-out incidents. Still, statistics show that motorcycles continue to be many times more dangerous than automobiles.

Therefore, there exists a need for an apparatus that improves motorcycle safety, while also improving motorcycle aesthetics.

BRIEF DESCRIPTION OF THE DRAWINGS

Various embodiments of the present invention taught herein are illustrated by way of example, and not by way of limitation, in the figures of the accompanying drawings, in which.

Figure 1:
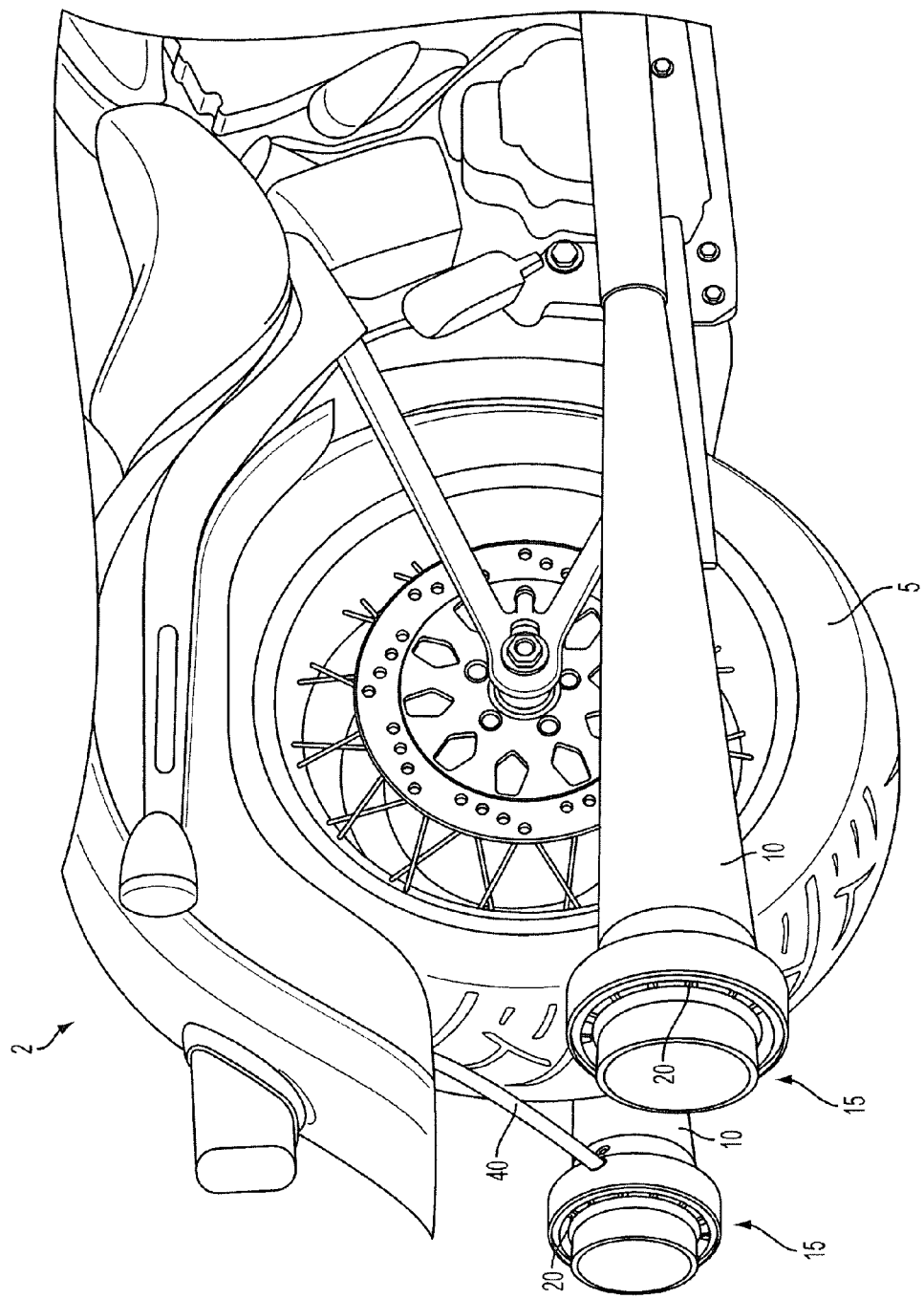
FIG. 1 is a rear quarter perspective view of a portion of a motorcycle with one embodiment of the present invention mounted thereon.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

Features and advantages of the present invention will be appreciated from review of the following detailed description of the invention, along with the accompanying figures in which like reference numerals are used to describe the same, similar or corresponding parts in the several views of the drawings.

DETAILED DESCRIPTION OF EMBODIMENTS OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention provides an integrated motorcycle exhaust tip that includes a turn signal assembly that includes both turn-signals, brake lights, and running lights integrated into the motorcycle exhaust tip. One feature of the present invention is that the manufacturer installed turn signal lights may be eliminated. Alternatively, for those motorcycle owners who wish to increase safety by increasing their "conspicuity" (i.e., their visibility), the additional lights provided by the illuminateable motorcycle exhaust apparatus 15 provide additional warning to motorists.

Motorcycles have been in production for over 100 years, built by manufacturers such as Aprilla, BMW, Buell, Ducati, Harley-Davidson, Honda, Indian, Kawasaki, Moto Guzzi, Suzuki, Triumph, Victory, Yamaha, and others. It will be appreciated that the present invention may be installed on any motorcycle built by the above-listed manufacturers, or other un-named manufacturers (some, or all of the above-listed manufacturer names may be registered trademarks of their respective owners).

One manufacturer that has become very popular in the United States, as well as through-out the world, is Harley-Davidson. Harley-Davidson manufactures many different models of motorcycles, which may be generally categorized into five different types: Touring models, Softail models, Sportster models, Dyna Glide models, and V-Rod models (Harley-Davidson is a registered trademark of H-D Michigan, Inc., of Arm Arbor Mich.).

For example, touring models may include the FLHT Electra Glide standard, FLHTC Electra Glide classic, FLHTCU Ultra Classic Electra Glide, FLHTP Electra Glide police, FLHS Electra Glide sport, FLHR Road King, FLHRC Road King classic, FLHP Road King police, FLTC Tour Glide classic, FLTCU Ultra classic tour Glide, FLTR Road Glide, FLHRS Road King custom, FLHRI Road King, FLHRSI Road King custom, FLHRCI Road King classic, FLTRI Road Glide, FLHTI Electra Glide standard, FLHTCI Electra Glide classic, and the FLHTCUI Ultra Classic Electra Glide (some or all of the above model names may be registered trademarks of H-D Michigan, Inc., of Ann Arbor Mich.).

Sportster models may include the Sportster XL883, Sportster XL883L, Sportster XL883C, Sportster XL883C custom, Sportster XL883R, Sportster XLH883, Sportster XLH883 Hugger, Sportster XLH883 Deluxe, Sportster XL1200C, Sportster XL1200C custom, Sportster XL1200R, Sportster XL 1200R Roadster, Sportster XLH1200, and the Sportster 1200S Sport (some or all of the above model names may be registered trademarks of H-D Michigan, Inc., of Ann Arbor Mich.).

Dyna Glide models may include the FXD Dyna Super Glide, FXDX Dyna Super Glide sport, FXDXT Dyna Super Glide T-sport, FXDL Dyna Low Rider, FXDP Dyna Defender, FXDS-CONV Dyna Convertible, FXDWG Dyna Wide Glide, FXDC/I Super Glide Custom, FXDI Dyna Super Glide, FXDXI Dyna Super Glide sport, FXDCI Super Glide custom, FXDLI Dyna Low Rider, and the FXDWGI Dyna Wide Glide (some or all of the above model names may be registered trademarks of H-D Michigan, Inc., of Ann Arbor Mich.).

V-Rod models may include the VRSCA V-Rod, VRSCB V-Rod, and the VRSCR Street Rod (some or all of the above model names may be registered trademarks of H-D Michigan, Inc., of Ann Arbor Mich.).

Softail models may include the FXST Softail Standard, FXSTI Softail Standard, FXSTB Night Train, FXSTBI Night Train, FXSTSI Springer Softail, FXSTDI Deuce, FLSTF Fat Boy, FLSTFI Fat Boy, FLSTFI Fat Boy 15$^{th}$ Anniversary Special Edition, FLSTNI Softail Deluxe, FLSTSCI Softail Springer Classic, FLSTC Heritage Softail Classic, FLSTCI Heritage Softail Classic, FLSTN Heritage Softail Special, FLSTS Heritage Springer, FXSTC Softail Custom, FXSTD Softail Deuce, FXSTS Springer Softail, and the FXSTSB Bad Boy (some or all of the above model names may be registered trademarks of H-D Michigan, Inc., of Ann Arbor Mich.).

Clearly, Harley-Davidson manufactures many different motorcycle models. It will be appreciated that the present invention may be installed on any of the above-listed models, or on other models yet to be manufactured. In addition, the present invention may be installed on a "custom" motorcycle, which is a motorcycle that differs from a manufacturer-produced model. For example, a custom motorcycle may be a Harley-Davidson FXST Softail Standard that has had specific parts either added, removed or modified. Or, a custom motorcycle may be built from scratch, using no, or very few pre-manufactured parts, such as only the engine, transmission and tires.

Whether a motorcycle is custom, or manufactured by Harley-Davidson or another manufacturer, it generally includes turn-signal lights, or turn indicators that warn other motorists of the motorcycle riders' intention to turn. The turn-signal lights, which may comprise a single light or two or more lights, are generally mounted in pairs, with a left and right turn indicator pair facing forward to alert on-coming traffic, and a second left and right turn indicator pair facing rearward to alert traffic that is behind the motorcycle. On some motorcycle models, the left and right turn indicator pair facing rearward also can provide a brake light function and a running light function. That is, at night, or even during daylight hours, a running light function constantly illuminates the rear-facing lights, and a brake light function illuminates the rear-facing lights when the motorcycle's brakes are applied.

In addition, whether a motorcycle is custom, or manufactured by Harley-Davidson or another manufacturer, it generally includes at least one exhaust pipe that directs the exhaust gasses from the motorcycle's engine toward the rear of the motorcycle. Most motorcycles have a pair of exhaust pipes, with one exhaust located on either side of the motorcycle, each having a distal end, or exhaust pipe tip that is directed toward the rear of the motorcycle.

For example, FIG. 1 illustrates a rear portion of a motorcycle 2 that includes a rear tire 5 and two exhaust pipes 10. Removeably attached to the tip of each exhaust pipe 10 is an illuminateable motorcycle exhaust apparatus ("IMEA") 15 that embodies principals of the invention. One feature of the IMEA 15 is that it includes a light assembly 20 that can replace, or augment the brake light(s) and the left and right turn indicator lights facing rearward that provide turn indicator, brake and running light functions.

Referring now to FIGS. 1-5, the IMEA 15 includes an integrated light assembly 20. The light assembly includes a lens 25 that may be clear (i.e., substantially transparent), or it may be opaque, tinted or "smoked." It will be appreciated by those skilled in the art that the tint may be virtually any color, such as red, yellow, blue or any other desired color.

Figure 2:
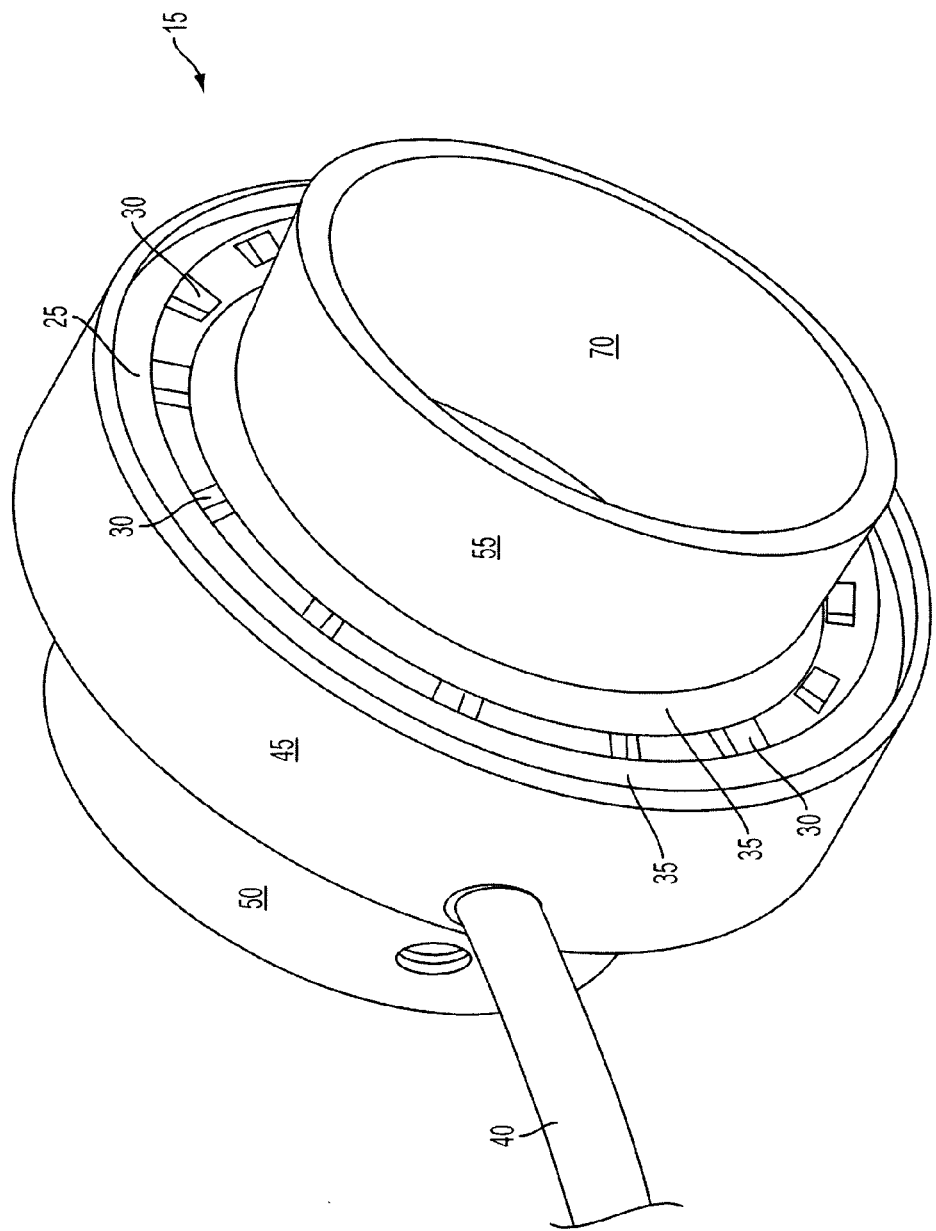
FIG. 2 is a front perspective view of the embodiment shown in FIG. 1.
Figure 3:
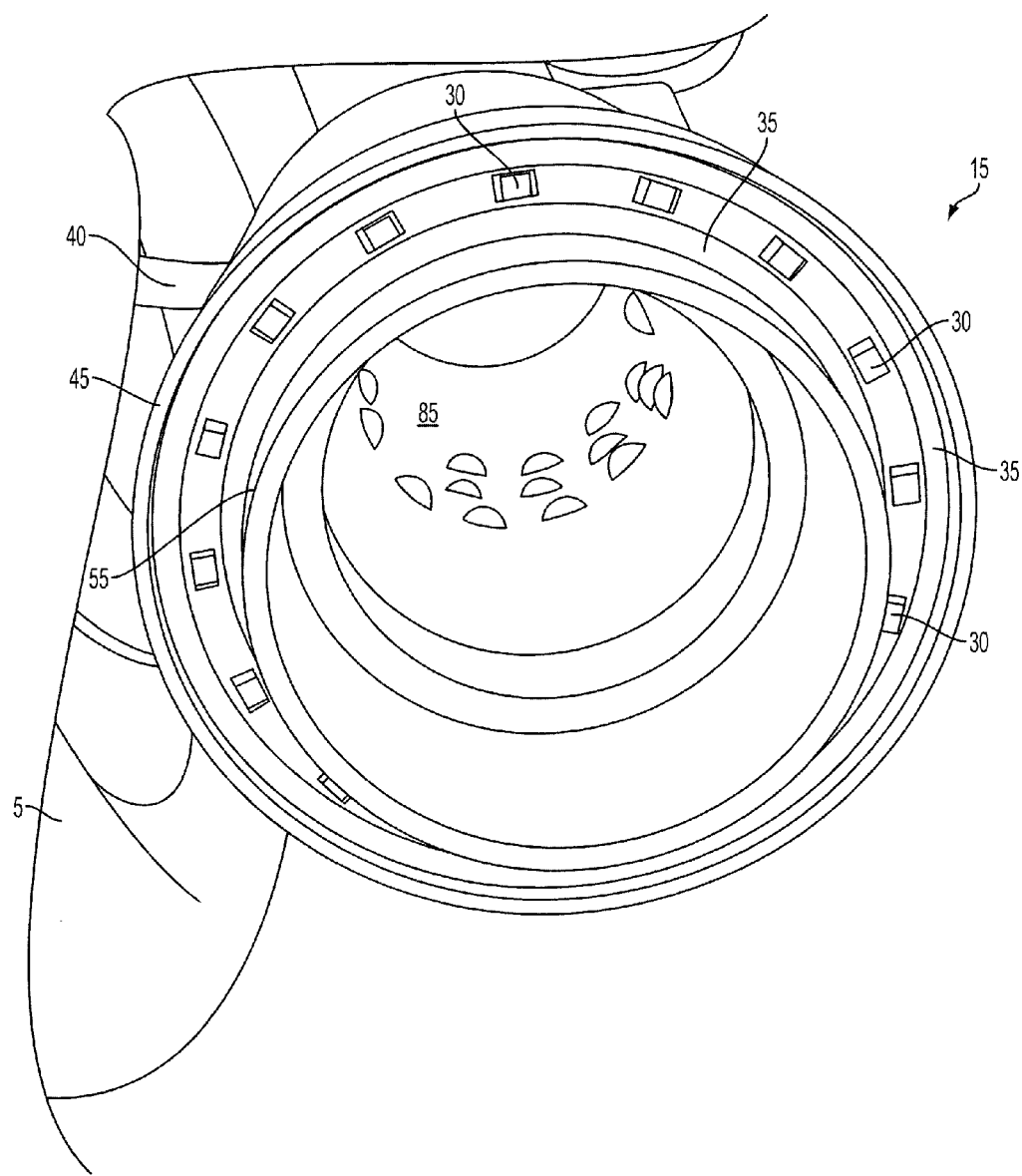
FIG. 3 is a front view of the embodiment shown in FIG. 1, and illustrates a motorcycle exhaust baffle retained by the invention.

As shown in FIGS. 2 and 3, the light assembly 20 includes one or more lights 30. In a preferred embodiment, the lights 30 comprise a plurality of light emitting diodes (LEDs) with each LED capable of emitting either a red or an amber, or yellow light. Other embodiments of the lights 30 may comprise one or more incandescent lights, halogen lights, fluorescent lights, or any other type of device that emits electromagnetic radiation that is perceived by the human eye.

Also shown in FIGS. 2 and 3 is the thermal insulator 35 that is positioned on both sides of the lights 30. In a preferred embodiment, the thermal insulator comprises a ceramic fiber combined with various binders. For example, the thermal insulator may be KAOWOOL Flex-Wrap manufactured by Morgan Thermal Ceramics (KAOWOOL is a registered trademark of Thermal Ceramics Inc., of Augusta, Ga.). It will be appreciated that other types of thermal insulators may be employed.

The lights 30 are connected to wiring connector 40 that is coupled to the motorcycle wiring harness (not shown) that provides electricity to the lights 30. For example, the lights 30 may be coupled to the turn signal switch that activates the turn indicator lights (not shown) on the motorcycle. In one embodiment of the IMEA 15, the wiring connector employs a commonly available three (3) or six (6), or other, pin connector that is well known to those skilled in the art. During installation, the connector on the motorcycle wiring harness for the brake and/or turn signal indicator is un-plugged, and the respective connector 40 is plugged into the wiring harness. In this way the brake, running, and turn indicator light functions of the IMEA 15 are enabled.

It will be appreciated that other arrangements for electrically powering the IMEA 15 may be employed. For example, the lights 30 may be turned on when the motorcycle headlight is turned on, or the lights 30 may be activated by a separate switch mounted on the motorcycle that enables illumination of the lights 30 at any time, as desired by the motorcycle operator.

For example, a motorcycle rider, wishing to turn, activates a turn signal switch or other mechanism on the motorcycle 2. The turn signal switch activates the lights 30 located in the IMEA 15 that is mounted on the same side of the motorcycle 2 as the desired turning direction. In addition, the lights 30 may be activated in a flashing, strobe or other type of illumination pattern.

Referring now to FIGS. 1-5, the IMEA 15 comprises a light assembly housing element sized to be removeably coupled to a distal end of a motorcycle exhaust 10. The light assembly housing element comprises a first outer surface 45 having a first outer circumference. As shown in FIG. 1, the wiring connector 40 extends from the first outer surface 45. A second outer surface 50 having a second outer circumference is directly adjacent to the first outer surface 45. A third outer surface 55 having a third outer circumference is opposite the second outer surface 50. That is, as shown in FIG. 2, the first outer surface 45 is located between the second outer surface 50 and the third outer surface 55. In a preferred embodiment, each surface 45, 50 and 55 is circular, with the light assembly 20 located between the first 45 and third 55 outer surfaces. However, in other embodiments, one, or all of the surfaces 45, 50 and 55 may be elliptical, square, rectangular or other shapes. That is, the IMEA 15 may be round (as illustrated), but it may also be elliptical, square, rectangular or other shapes.

Figure 4:
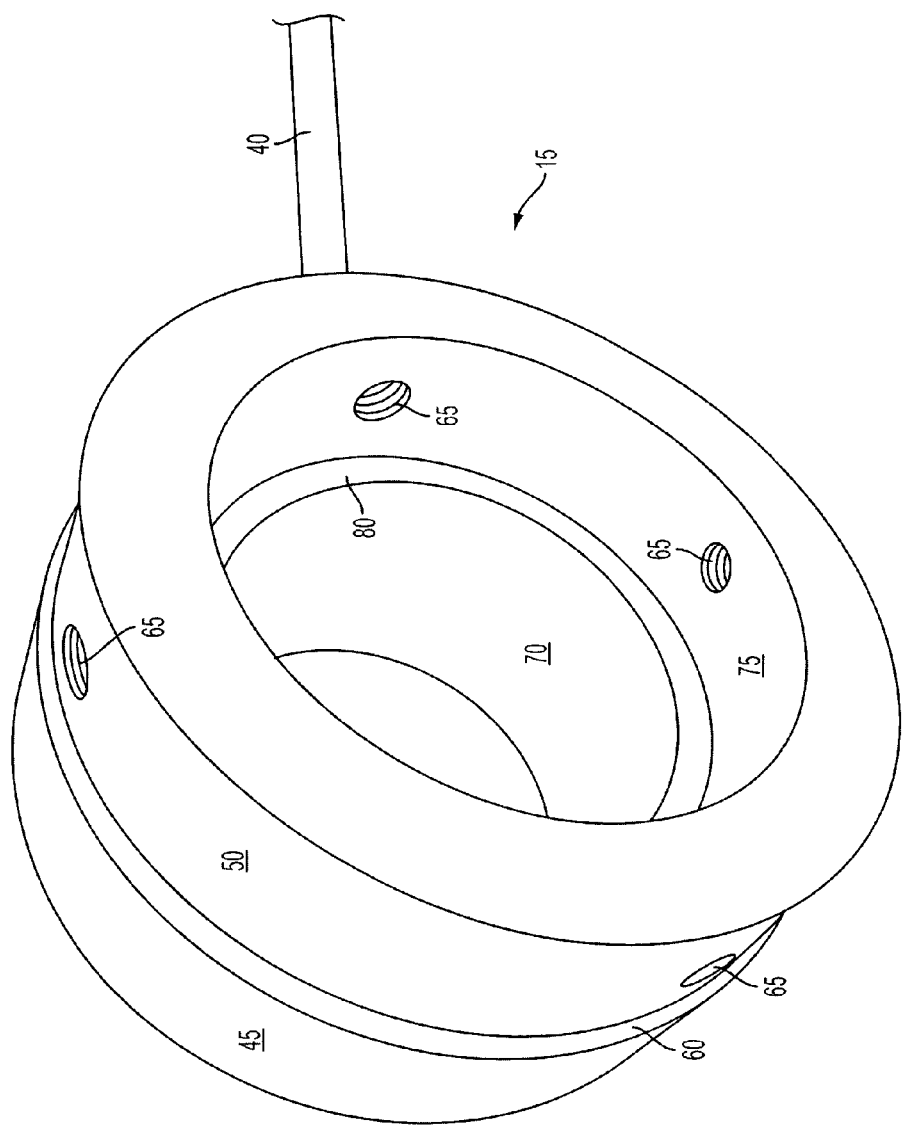
FIG. 4 is a rear perspective view of the embodiment shown in FIG. 1.

As shown in FIG. 4, the difference in diameters, or circumferences between the first 45 and second 50 outer surfaces forms an outer lip 60 that extends around the entire outer surface of the IMEA 15. During installation of the IMEA 15 to the motorcycle exhaust pipe 10, the second outer surface 50 of the IMEA 15 is inserted into the motorcycle exhaust pipe 10 until the outer lip 60 contacts the motorcycle exhaust pipe 10. Fasteners are then inserted through apertures 65 that are located in the second outer surface 50, securing the IMEA 15 to the motorcycle exhaust pipe 10. Before the IMEA 15 is installed, the "stock" or original exhaust tip is removed.

Also shown in FIG. 4 is the first inner surface 70 having a first inner circumference and a second inner surface 75 having a second inner circumference larger than the first inner circumference. The difference in diameters, or circumferences between the first 70 and second 75 inner surfaces forms an inner lip, or shoulder 80 that extends around the entire inner surface of the IMEA 15. During installation of the IMEA 15 to the motorcycle exhaust pipe 10, the inner lip 80 contacts, and retains in position, the motorcycle exhaust pipe baffle 85, shown in FIG. 3. Without the inner lip 80 contacting, and retaining the exhaust pipe baffle 85, the baffle 85 would not be retained within the exhaust pipe 10.

Referring now to FIG. 2, the third outer surface 55 and a portion of the first inner surface 70 combine to form a cylinder that extends from the light assembly 20. The cylinder forms the distal end, or tip of the motorcycle exhaust 10.

Figure 5:
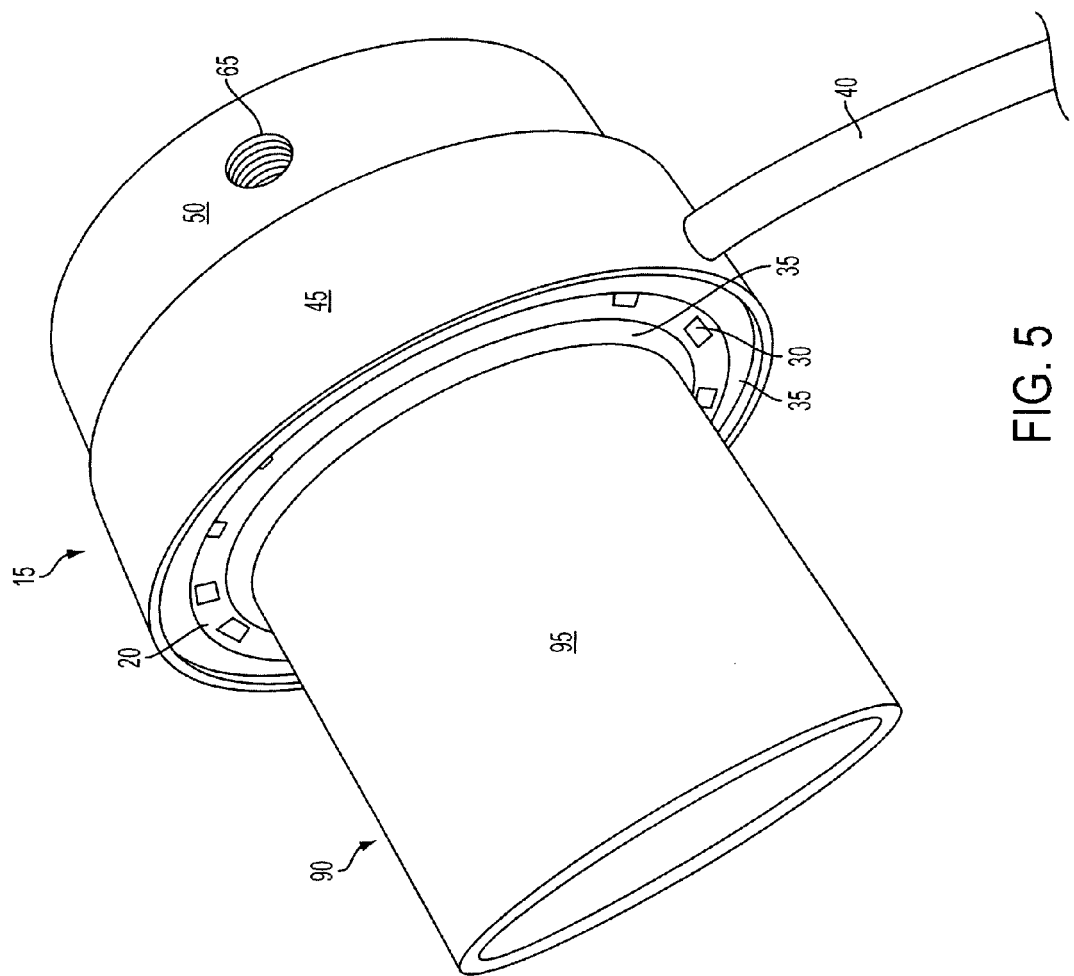
FIG. 5 is a perspective view of the embodiment shown in FIG. 1, and illustrates an optional insertable exhaust tip extending from the embodiment of FIG. 1.

Shown in FIG. 5, a removeable motorcycle exhaust tip 90 is illustrated. The removeable motorcycle exhaust tip 90 may be installed to personalize or customize the motorcycle 2, and extends beyond the length of the exhaust tip formed by the third outer surface 55 and a portion of the first inner surface 70, discussed above.

The exhaust tip 90 comprises a removeable cylinder 95 having a flange (not shown) located about a first end of the cylinder 95, the flange sized to abut the inner lip 80, with a distal portion of a second end of the cylinder 95 sized to extend beyond the light assembly 20. That is, the exhaust tip 90 is an insertable motorcycle exhaust tip element sized to be removeably insertable into the IMEA 15 so that a distal end portion of the motorcycle exhaust tip 90 extends beyond the light assembly 20.

The outer circumference, or surface of the exhaust tip 90 is sized so that it closely fits against the first inner surface 70. The outer diameter of the exhaust tip 90 does not need to remain constant, and can taper to a smaller diameter beyond where the cylinder 95 contacts the first inner surface 70. In addition, the portion of the cylinder 95 that extends beyond where the cylinder 95 contacts the first inner surface 70, and the light assembly 20 can be customized. For example, the cylinder 95 may have a plurality of apertures (not shown) or may include a plurality of scallops (not shown) arranged lengthwise on the surface of the cylinder 95. The tip of the cylinder 95 may include cut-outs, or may include "flame" shapes (not shown).

One advantage of the IMEA 15 is that it may replace the "stock" or original rear-facing running lights, brake lights and turn-signals, thereby eliminating the brake and turn signal lights that are usually mounted on stalks, or from other parts of the motorcycle 2. For motorcycle owners that wish to "customize" their motorcycles by "cleaning up" the motorcycle (i.e., eliminating components), the IMEA 15 eliminates the turn signals installed by the manufacturer.

Alternatively, for those motorcycle owners who wish to increase safety by increasing their "conspicuity" (i.e., their visibility), the additional lights provided by the IMEA 15 provide additional warning to motorists that the rider wishes to turn. In this case, the owner may wish to retain the original, manufacturer installed brake lights, running lights and turn signals, and add the additional lighting provided in the IMEA 15 (as shown in FIG. 1).

The IMEA 15 provides several functions and features. The IMEA 15 increases safety by increasing the "conspicuity" (i.e., the visibility) of the motorcycle by increasing the number of lights on the motorcycle, which provides additional warning and notice to motorists.

For example, the lights 30 contained in the IMEA 15 may function as either primary, or secondary turn-signal indicators (i.e., turn lights). That is, the motorcycle may not have any dedicated turn signal lights, and the lights 30 contained in the IMEA 15 function as the only, or primary turn signal indicators.

Alternatively, the lights 30 contained in the IMEA 15 may function as secondary turn-signal indicators. For example, a motorcycle rider, wishing to turn, activates a turn signal switch or other mechanism on the motorcycle. The turn signal switch activates the factory-installed (i.e., original motorcycle manufacturer) turn signal indicators on the motorcycle, which also activates the lights 30 in the IMEA 15 located in the appropriate side of the motorcycle.

The lights 30 on the IMEA 15 may be illuminated in a flashing, strobe, consecutive, sequential, or other type of illumination pattern.

It will be appreciated that the IMEA 15 may be installed on any existing type or model of motorcycle 2. In addition, the IMEA 15 may be installed on a "custom" motorcycle, which is a motorcycle that differs from a manufacturer-produced model. For example, a custom motorcycle may be a Harley-Davidson FXST Softail Standard that has had specific parts either added, removed or modified. Or, a custom motorcycle may be built from scratch, using no, or very few pre-manufactured parts, such as only the engine, transmission and tires. In addition, the IMEA 15 may be fitted on two-wheel motorcycles (with or without a side-car), and "trikes" (three-wheeled motorcycles).

It is to be noticed that the term "comprising", used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B. Similarly, it is to be noticed that the term "coupled", also used in the claims, should not be interpreted as being limitative to direct connections only.

Thus, it is seen an illuminateable motorcycle exhaust apparatus is provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A motorcycle apparatus, comprising:
a cylindrical housing sized to be removeably coupled to a distal end of a motorcycle exhaust, the cylindrical housing comprising:
a first outer surface having a first outer circumference;
a second outer surface having a second outer circumference, with the second outer circumference smaller that the first outer circumference and where the second outer circumference is sized to fit within the distal end of the motorcycle exhaust;
a third outer surface having a third outer circumference, the third outer circumference smaller than the second outer circumference; and
a thermally insulated light assembly coupled to the cylindrical housing, and located between the first and third outer surfaces, the thermally insulated light assembly comprising a plurality of visible-light emitting elements.

2. The motorcycle apparatus of claim 1, further comprising an insertable motorcycle exhaust tip sized to be removeably insertable into the cylindrical housing so that a distal end portion of the motorcycle exhaust tip extends beyond the cylindrical housing.

3. The motorcycle apparatus of claim 2, where the insertable motorcycle exhaust tip comprises:
a cylinder having a flange located about a first end of the cylinder, the flange sized to abut a shoulder surface located within the cylindrical housing, with a distal portion of a second end of the cylinder is sized to extend beyond the third outer surface.

4. The motorcycle apparatus of claim 1, where the plurality of visible-light emitting elements are capable of providing a brake signal indication, a running light indication, and a turn signal indication.

5. The motorcycle apparatus of claim 1, where the cylindrical housing further comprises:
a first inner surface having a first inner circumference;
a second inner surface having a second inner circumference larger than the first inner circumference; and
a shoulder surface located between the first and second inner surfaces.

6. The motorcycle apparatus of claim 5, where a motorcycle exhaust baffle is retained by the shoulder surface when the motorcycle apparatus is positioned at the distal end of the motorcycle exhaust.

7. The motorcycle apparatus of claim 5, further comprising a light assembly cylinder extending from an inner circumference of the thermally insulated light assembly, the light assembly cylinder comprising the third outer surface and the first inner surface.

8. The motorcycle apparatus of claim 1, where the thermally insulated light assembly comprises:
at least one light emitter selected from a group consisting of: an incandescent light, a light-emitting diode (LED), a fluorescent light, a halogen light, and a combination of two or more thereof; and
a thermal insulator located about the at least one light emitter.

9. A motorcycle apparatus, comprising:
a light assembly housing sized to be removeably coupled to a distal end of a motorcycle exhaust;
a thermally insulated light assembly coupled to the light assembly housing, the thermally insulated light assembly comprising a plurality of light emitting elements and a thermal insulator located adjacent to the light emitting elements;
an insertable motorcycle exhaust tip sized to be removeably insertable into the light assembly housing so that a distal end portion of the motorcycle exhaust tip extends from the light assembly housing, and where the light assembly housing further comprises:
a first inner surface having a first inner circumference;
a second inner surface having a second inner circumference larger than the first inner circumference; and
a shoulder surface located between the first and second inner surfaces;
where a motorcycle exhaust baffle is retained by the shoulder surface when the motorcycle exhaust apparatus is positioned at the distal end of the motorcycle exhaust.

10. The motorcycle apparatus of claim 9, where the light emitting elements are capable of providing a brake indicator function, a running light function, and a turn indicator function.

11. The motorcycle apparatus of claim 9, where the light assembly housing is selected from a group consisting of: a round light assembly housing, an elliptical light assembly housing, a square light assembly housing, and a rectangular light assembly housing.

12. The motorcycle apparatus of claim 9, where the insertable motorcycle exhaust tip comprises:
a cylinder having a flange located about a first end of the cylinder, the flange sized to abut a shoulder surface located within the light assembly housing; and
where a distal portion of a second end of the cylinder is sized to extend from the light assembly housing.

13. A motorcycle exhaust apparatus positionable at a distal end of a motorcycle exhaust, the motorcycle exhaust apparatus comprising:
a first outer surface having a first outer circumference;
a second outer surface having a second outer circumference, with the second outer circumference smaller that the first outer circumference and the second outer circumference is sized to fit within the distal end of the motorcycle exhaust;
a third outer surface having a third outer circumference, the third outer circumference smaller than the second outer circumference; and
a light assembly located between the first and third outer surfaces.

14. The motorcycle apparatus of claim 13, where the light assembly is structured to provide at least one of a turn signal indication, a brake signal indication, and a running light indication.

15. The motorcycle apparatus of claim 13, further comprising an insertable motorcycle exhaust tip element sized to be removeably insertable into the motorcycle exhaust apparatus so that a distal end portion of the motorcycle exhaust tip element extends from the motorcycle exhaust apparatus.

16. The motorcycle apparatus of claim 13, where the light assembly comprises:
- at least one light emitter selected from a group consisting of: an incandescent light, a light-emitting diode (LED), a fluorescent light, a halogen light, and a combination of two or more thereof; and
- a thermal insulator located about the at least one light emitter.

17. The motorcycle apparatus of claim 13, further comprising a first inner surface having a first inner circumference;
- a second inner surface having a second inner circumference larger than the first inner circumference; and
- a shoulder surface located between the first and second inner surfaces.

18. The motorcycle apparatus of claim 17, where a motorcycle exhaust baffle is retained by the shoulder surface when the motorcycle exhaust apparatus is positioned at the distal end of the motorcycle exhaust.

\* \* \* \* \*